Oct. 22, 1929.      H. A. MYERS.      1,732,981
AUTOMOBILE WINDOW REGULATOR SUPPORT
Filed April 17, 1926      2 Sheets-Sheet 1

Inventor
Hubert A. Myers
By
Attorney

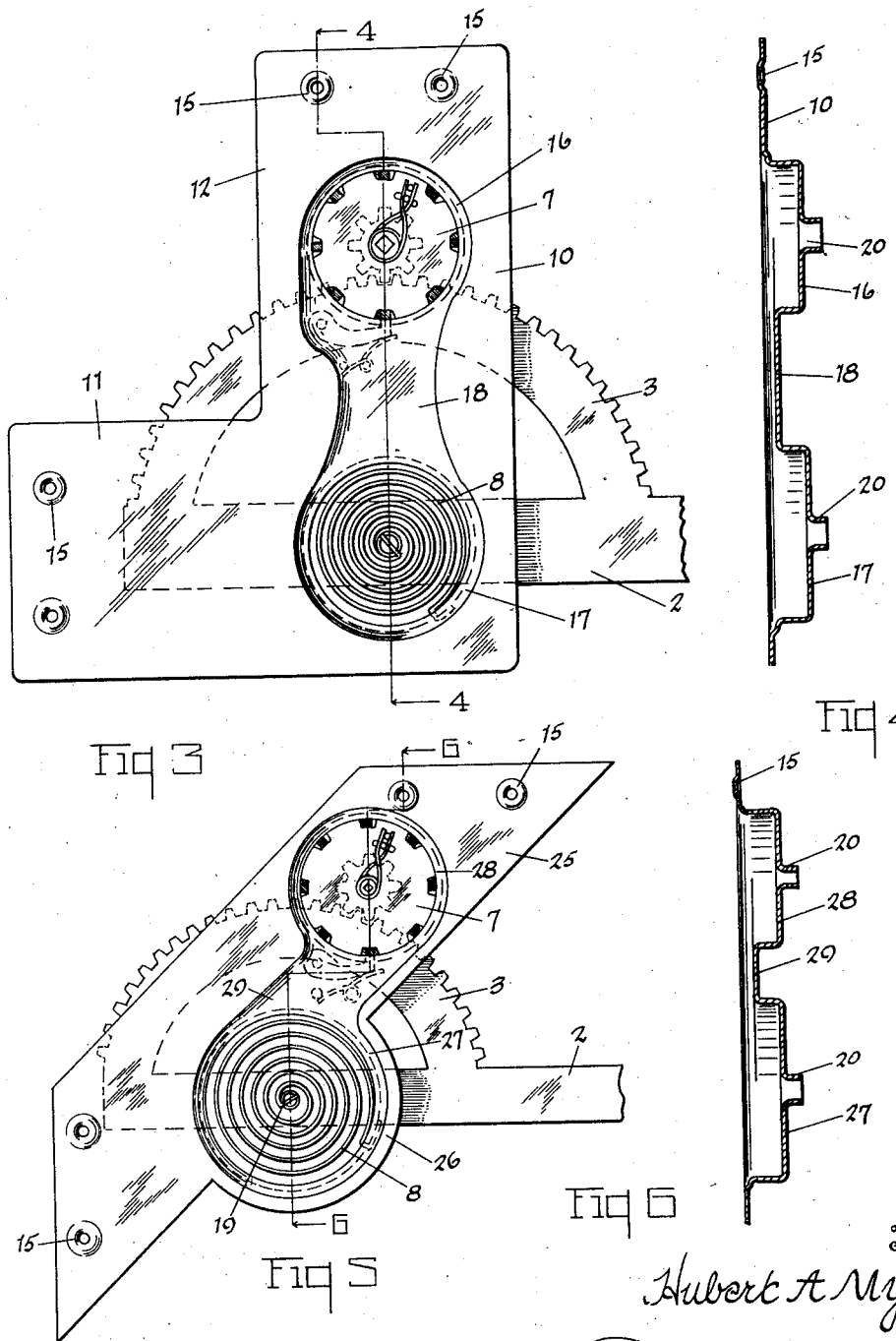

Patented Oct. 22, 1929

1,732,981

UNITED STATES PATENT OFFICE

HUBERT A. MYERS, OF TOLEDO, OHIO, ASSIGNOR TO THE MYERS REGULATOR COMPANY, OF TOLEDO, OHIO, A CORPORATION OF OHIO

AUTOMOBILE WINDOW-REGULATOR SUPPORT

Application filed April 17, 1926. Serial No. 102,639.

My invention has for its object to provide a support for window regulators whereby a window regulator in its entirety may be readily secured in position in the frame of an automobile body. The invention particularly has for its object to cheapen the cost of manufacture of the window regulator as a whole and to so construct it that its parts may be supported by a single plate that may be readily attached to the frame.

In many of the forms of construction now used, a pair of supporting plates are required and owing to the fact that these parts are necessarily secured on the inside of the frame of the automobile the mounting of the window regulator necessitates the securement of the plates separately while the parts of the regulator are held in position in order that they may register with one or both of the plates. By my invention the parts of the regulator are supported on a single plate when secured in position in advance of the installment of the regulator in the automobile body. When, therefore, the regulator involving my invention is to be installed all that is required is to secure the supporting plate in position in the frame. Thus the invention eliminates the cost of the material and the making of the additional plate and the cost of installation. The total cost thus saved is very important in this class of device where competition is keen, and the saving of a very small amount of cost of production makes the greater difference between commercial success and commercial failure of the invention.

Furthermore my invention provides for the support and location of the controlling mechanism of the window regulator within the space of the parts that form the frame of the section or part of the automobile body in which the window is located, so that the exterior of the supporting part and the window regulator mechanism is located within the confines of the frame and consequently does not utilize any space in which the window glass is located and enables the reduction of the thickness of the wall of the automobile body to that thickness only required for the support and guidance of the glass that forms the window and only such thickness of the frame as may be required to give the automobile body the required strength.

The invention may be contained in window regulator supporting members that may be varied in form and to illustrate a practical application of the invention I have selected two forms of window regulator supports as illustrations of embodiments of my invention and shall describe them hereinafter.

Figure 1:
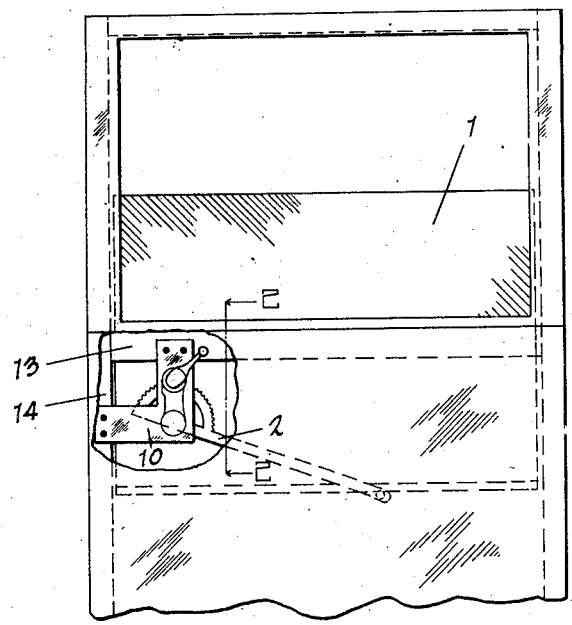
Figure 2:
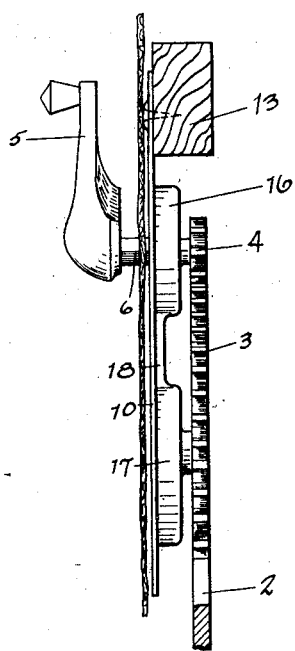

Figure 1 illustrates a side view of a door of an automobile, a part being broken away to illustrate the structure containing my invention. Fig. 2 is a view of a section taken on the plane of the line 2—2 indicated in Fig. 1. Fig. 3 illustrates a side view of the form of construction shown in Fig. 1. Fig. 4 is a view of a section taken on the plane of the line 4—4 indicated in Fig. 3. Fig. 5 is a side view of a modified form of window regulator support. Fig. 6 is a view of a section taken on the plane of the line 6—6 indicated in Fig. 5.

The forms of the supporting window regulators that are selected as embodiments of my invention are shown in the drawings as being used in connection with the well known arm and sector type of window regulator where the window, namely, the glass 1, is raised by means of an arm 2 that is secured to the sector gear 3. The outer end of the arm 2 may be provided with a suitable pin or roller that is located beneath the lower edge of the window or preferably below the lower side of the U-bar or channel bar that edges the lower edge of the glass that forms the window. The sector 3 is operated by means of a pinion 4 which is actuated by means of a crank 5 to cause the sector gear 3 to move about its axis and swing the arm 2 so as to raise and lower the window 1. In order to secure the window in the position in which it is moved by the operation of the glass 5, a suitable clutch or locking member, that automatically releases upon rotation of the crank and locks when the crank ceases to be rotated, is usually connected to the pinion 4 either directly or indirectly through its shaft 6 to which the crank is connected. I have illustrated a clutch lock 7 which operates to lock the pinion 4 in its position when the crank is released. Any form of clutch may be used for this purpose.

Also in order to produce the uniform effect in the operation of the crank 5, particularly to produce the same "feel" in raising the window that is produced in the lowering of the window, a counter-balancing spring 8 is connected to the sector 3. The spring 8 may be of spiral form and is drawn or turned so that its elasticity will be sufficient to counter-balance a substantial part of the weight of the window glass 1. The spring 8 is usually connected to the shaft of the sector gear 3 at one end and to a fixed part of the window regulator support. As shown in the figures the convolute spring 8 is secured to the shaft of the sector and to the supporting plate of the window regulator.

The supporting plate 10 of the window regulator shown in Figs. 1, 2, 3, and 4 of the drawings is L-shaped. The length of one of the legs, such as the leg 11, of the supporting plate being the same as the width of the other leg, such as the leg 12, the supporting plates may be struck from sheet material without waste. In installing the window regulator the upper end of the L-shaped plate 10 is secured to a cross bar, such as the cross bar 13, of the frame of the automobile body, that is, in the particular illustration shown in Fig. 1, the cross bar of the door frame of the automobile body while the other end of the L-member is secured to the vertical member 14 of the door frame. This may be done by means of screws that are inserted in the openings 15 formed in the ends of the plate 10 in order to support the mechanism within the space defined by the edges of the frame and thus confine the window regulator within the frame. The plate 10 is die-pressed to receive the clutch member 7 and also to receive the spring 8. Thus in assembling a window regulator after the door is formed and before the interior of the automobile is decorated with the usual cloth material, the regulator may be installed by merely placing the plate on the parts of the door frame and inserting the screws. The interior of the automobile may then be covered with the fabric and the window dropped in position and the handle connected to the shaft of the driving pinion. The decorating material will thus be located over the plate while the clutch member 7, the spring 8, the gears 3 and 4 will be located within the space formed by the frame. The recessed portion 16 may be used for receiving the clutch 7 while the recessed portion 17 may be used for receiving the spring 8. If desired these portions may be joined by a recessed neck portion 18. The recessing of the plate 10 increases the rigidity of the plate, particularly, that portion of the plate that is located intermediate the driving mechanism and the driven mechanism of the automobile window regulator. The remainder of the plate may be flexible but it does not materially affect the operation of the window regulator and consequently the plate may be formed of a thinner material than is commonly used for supporting window regulators.

In order to form a broad bearing, that is, a bearing of considerable area for the crank shaft 6 and the shaft 19 of the sector gear 3, lips 20 may be formed around the openings for receiving the shafts. The lips 20 thus form not only a bearing for rotatably supporting the shafts but also a lateral bearing for preventing angular movement of the pinion on one hand and the sector gear on the other. They thus keep them alined one with the other.

If desired the same recessing may be produced in the form of supporting plate shown in Figs. 5 and 6. In this form of plate the end edges of the plate are so shaped that the plate may be located diagonally across a corner of a part of the frame. In the form of such a plate, however, there is not the economy in the use of the material from which the plates are formed as in the form of plates shown in the other figures. The plates shown in Figs. 5 and 6, however, are installed with the same readiness and ease that the plate shown in the other figures is installed and, furthermore, there is not the same rigidity produced in the recessing of the plate shown in Figs. 5 and 6 that there is in the plate shown in the other figures. In order to reduce the quantity of material in the plate 25 the plate has a protruding edge portion 26 whereby the spring 8 may be located within the recess 27 and thus be located within the space that is defined by the frame of the door in which the window is located. The recessed part 27 also communicates with the recessed portion 28 of the clutch 7 by the recessed area 29.

I claim:

1. In an automobile window regulator, a plate on which the parts of the window regulator are supported, for mounting the window regulator as a unit in the automobile body frame, a sector pivotally mounted on the plate, an arm connected to the sector for engaging the window, a convolute spring for counter-balancing the weight of the window, one end of the spring connected to the plate and the other end of the spring connected to the sector, a pinion for operating the sector, a clutch lock mechanism for locking the pinion in position, the plate having recesses for receiving the spring and the clutch mechanism, the plate secured to the frame on the side of the plate that protrudes to form the recesses to locate the sector, the pinion, the spring and the clutch lock within the planes of the sides of the portion of the frame of the automobile in which the regulator is located.

2. In an automobile window regulator, a plate on which the parts of the window regulator are supported for mounting the window regulator as a unit in the automobile body frame, a sector pivotally mounted on the plate, a convulute spring for counter-balancing the weight of the window, a pinion for operating the sector, the plate having recesses for receiving the spring, the plate secured to the frame on the side of the plate that protrudes to form the recess, to locate the sector and the spring within the planes of the sides of the portion of the frame of the automobile in which the regulator is located.

3. In an automobile window regulator, a supporting plate, the plate having a recess formed therein, the walls of the recess struck up from the said plate, an arm for raising and lowering the window, a convolute counterbalancing spring for counterbalancing the weight of the window and connected to the arm, the said arm pivotally supported on the end wall of the recess and located on the outside of the end wall of the recess, and the spring located in the recess to locate the parts of the window within the planes of the sides of the frame.

4. In an automobile window regulator, a plate on which the parts of the window regulator are supported and having two recesses formed therein, the walls of the recesses struck up from the said plate, a sector and arm for raising and lowering the window, a pinion for operating the sector, a clutch for locking the pinion and sector to the plate, a convolute spring connected to the sector and located in one recess, the sector and arm having a pivotal bearing in the end wall of the recess in which the spring is located, the clutch located in the other recess and the pinion having a bearing on the end wall of the recess in which the clutch is located.

5. In an automobile window regulator, a supporting plate having recesses, the walls of the recesses struck up from the said plate, rotatable driving and driven members connected to the window for raising and lowering the window, the said members having rotating bearing parts supported in the end walls of the recesses, parts of the mechanism located in the recesses and parts located on the outside of the end walls to locate all the parts of the mechanism within the planes of the sides of the frame of the part of the automobile to which the window regulator is secured.

In testimony whereof I have hereunto signed my name to this specification.

HUBERT A. MYERS.